June 27, 1972 K. F. ROSER 3,672,749
SIGHT GLASS FOR THE INSIDE INSPECTION OF
PIPES AND CLEANING OF SAME
Filed Sept. 11, 1970
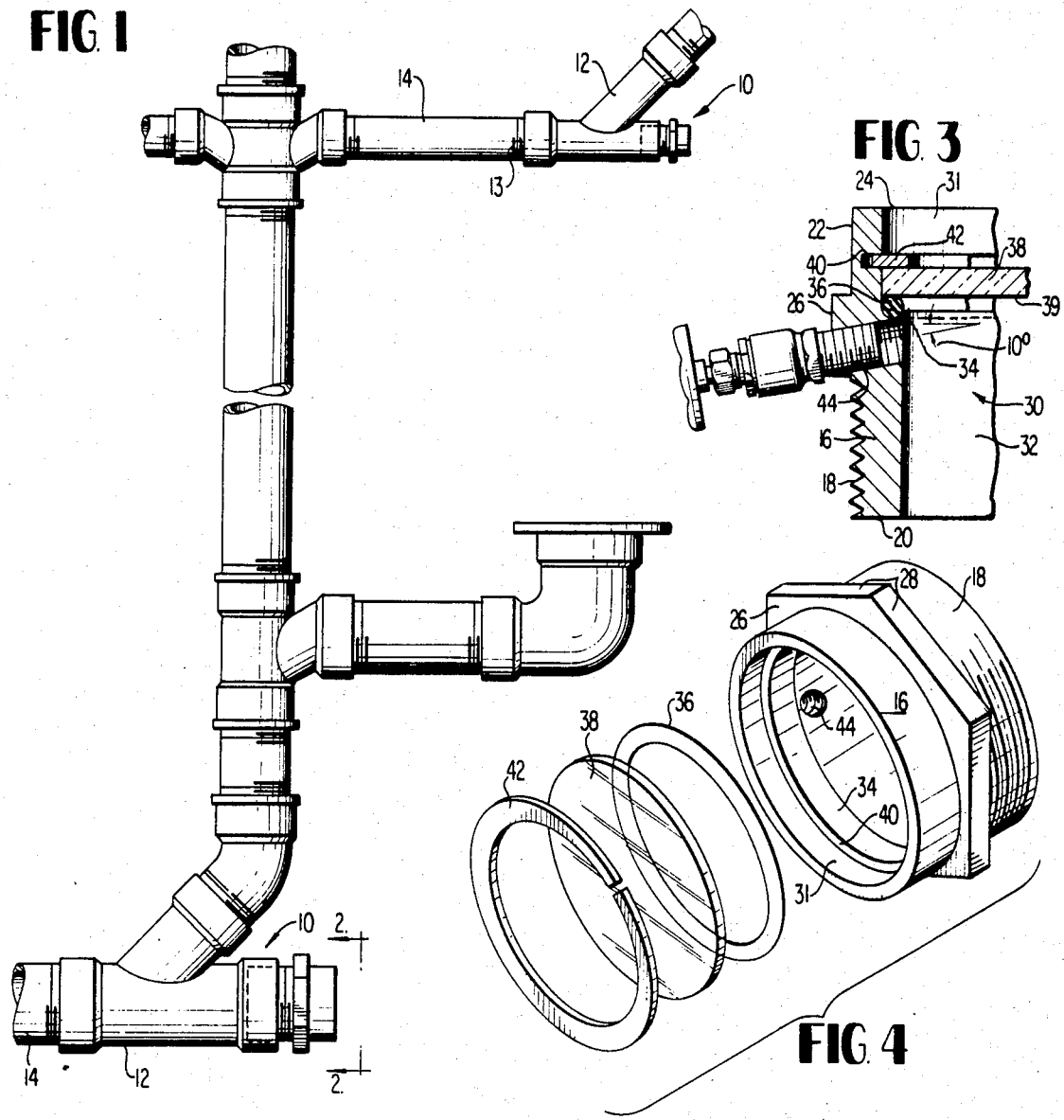
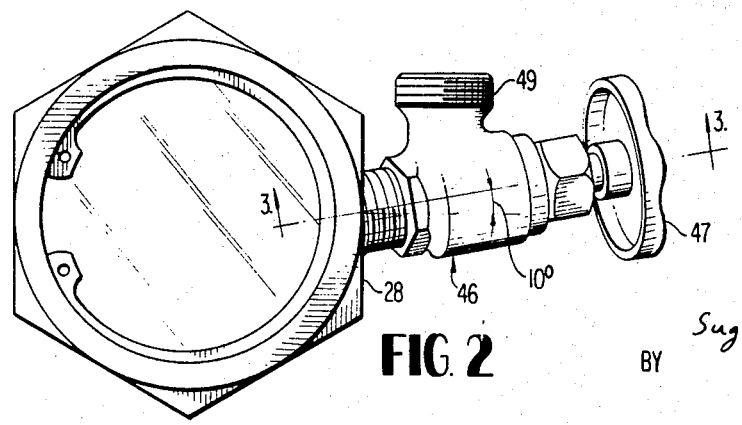
INVENTOR
KENNETH F. ROSER
BY Sughrue, Rothwell, Mion, Zinn & Macpeak
ATTORNEYS United States Patent Office 3,672,749
Patented June 27, 1972

3,672,749
SIGHT GLASS FOR THE INSIDE INSPECTION OF PIPES AND CLEANING OF SAME
Kenneth F. Roser, R.F.D. 4, Rome, N.Y. 13440
Continuation-in-part of application Ser. No. 826,946, May 22, 1969. This application Sept. 11, 1970, Ser. No. 71,439
Int. Cl. G02b 5/00
U.S. Cl. 350—319                                3 Claims

ABSTRACT OF THE DISCLOSURE

A sight glass plug having a threaded outer portion for connection to a standard building pipe fitting and a hollow interportion having a circular seat and a spaced apart recess in the surface thereof for holding an O-ring, a glass viewing window, and a snap-ring in sealing engagement with the inner surface of the plug. A valve controlled inlet allows pressurized fluid to impinge against the glass and the plug housing interior at a double inclination to ensure vortex cleaning of the same.

This is a continuation in part application based on application of Kenneth F. Roser, Ser. No. 826,946, filed May 22, 1969, now abandoned.

BACKGROUND OF THE INVENTION

Field of the invention

This invention relates to sight glasses and more particularly to a sight glass plug capable of being threaded into pipe fittings having standard threads used in the plumbing of building structures or the like to permit viewing of the inside surfaces of the pipes. The ability to view the inside of pipes is advantageous for many reasons, foremost of which is that it permits the rapid inspection of the inside of a pipe for defects which may cause leaks or obstructions which hinder the flow of fluid in the pipe.

The ability to pinpoint the location of such defects or obstructions enables one to correct these situations quickly and without the necessity of hunting for and removing a large amount of good pipe before the defect or obstruction is finally located, thus resulting in a considerable saving in time and money. Furthermore, underground pipes can be easily checked for sagging which may cause undue strain on connecting joints. In addition, building inspectors can easily determine if faulty workmanship is present in the areas where pipes or pipe fittings are joined such as the use of excessive solder in sweated joints or an insufficient amount of the thread of one fitting engaging the mating thread of another fitting. The present invention provides a unitary sight glass plug which is easily insertable into existing pipe lines whereby one can clearly view conditions which exist within the inside surfaces of the pipes.

Description of the prior art

Sight glasses used for viewing the internal conditions existing in steam boilers, crankcases of engines and the like are known. These sight glasses often take the form of thick pieces of glass which were threaded or cemented into a recess in the housing of the object to be viewed. Due to their frangible nature, these sight glasses require extreme care in their installation as well as their use and were often difficult to seal against fluid leakage. Other sight glasses of the prior art consist of numerous machined parts which are expensive to manufacture, not adaptable to existing standard threaded pipe fittings, and which are incapable of being repaired or cleaned easily.

SUMMARY OF THE INVENTION

This invention sets forth a sight glass in the form of a plug which is of simple construction and which is capable of being used in all pipe fittings having standard pipe threads.

More specifically, the invention comprises a hollow cylindrical housing in the form of a plug which has standard pipe threads on a portion of the outer surface of one end thereof for engaging corresponding standard threads on the inside surface of a pipe fitting to which it is attached. The outer surface of the other end of the plug is smooth thus facilitating the attachment of a camera using infrared light in the event a picture of the inside of the pipe is desired. Between the threaded and smooth portions of the outer surface is a radially extending central portion having flat sides to enable the housing to be screwed into a pipe fitting with a wrench without damaging either the threaded or smooth portion.

The inside wall of the cylindrical housing has a circular seat which receives a self-sealing O-ring of flexible material such as rubber. A circular piece of clear shatterproof glass or clear plastic is positioned adjacent the O-ring and is held in sealing engagement therewith by means of a conventional snap-ring. The snap-ring is forced against the glass until the O-ring compresses sufficiently to permit the snap-ring to enter a precisely located groove in the inside wall of the housing. The seal so obtained between the glass, the O-ring and the housing is capable of withstanding pressures in the order of 700 pounds per square inch without leaking. The use of certain plastic viewing windows have withstood pressures of 3400 pounds per square inch. A threaded port is also provided which extends at an angle of approximately 10 degrees from the central portion of the outside surface of the housing to the inside surface of the housing adjacent the inside surface of the shatterproof glass. This port facilitates draining of the pipe to which the sight glass is attached without the necessity of removing the entire sight glass assembly. In addition, a hose can be attached to the port for introducing a fluid to either clean the glass or the pipes to which the assembly is attached. It has been found, however, that if the inside surface of the glass is kept at a distance greater than 1 (one) inch from the outside edge of the threaded portion of the housing, self-cleaning of the inside surface of the glass occurs as a result of the motion of the fluid inside the housing against the glass. When the port is not in use, a small plug is inserted to close the port.

Preferably, the inclination of the port is also to one side of the longitudinal center plane passing through the housing and the port opening, also at or near 10°. A vortex cleansing action results since the pressurized cleaning liquid impacts the inner housing wall at an angle. A valve in the port coupling readily controls the force of the applied liquid.

The glass can be conventional shatter-proof safety plate glass or it can have a magnification factor to aid in viewing the interior of the pipe to which it is attached. The sight glass can be made in a plurality of sizes for use with different size pipes and pipe fittings having standard pipe threads. The O-ring, viewing glass, and snap-ring are of standard dimensions and are commercially available which permits their replacement at nominal cost in the event of breakage or normal wear.

BRIEF DESCRIPTION OF THE DRAWINGS

FIG. 1 is an elevational view showing the use of the sight glass apparatus of the present invention with conventional pipe fittings;

FIG. 2 is a front view of the sight glass apparatus taken about lines 2—2 of FIG. 1;

FIG. 3 is a sectional view of a portion of the sight glass apparatus taken about lines 3—3 of FIG. 2;

FIG. 4 is a perspective view of the sight glass apparatus.

DETAILED DESCRIPTION OF THE INVENTION

Referring to the drawings, FIG. 1 shows by way of example, how the sight glass indicated generally at 10 is positioned in the end of conventional pipe fittings 12 for a building structure or the like, in order that the inside of both the fittings 12 and pipes 14 can be inspected for obstructions or defects and the like.

The sight glass plug 10 has a hollow cylindrical housing 16 of a material such as brass which can be of any diameter depending on the size of the opening of the pipe fitting to which it is attached. The outside surface of the housing 16 has a threaded portion 18 extending inwardly from one end 20 and a smooth portion 22 extending inwardly from the viewing end 24. The threads 18 are standard tapered type threads of the self-sealing type. A portion 26 is located between and expands radially beyond the threaded portion 18 and smooth portion 22. The portion 26 has flat sides 28 in the form of a hexagon, FIG. 2, on which a wrench can be used to install or remove the sight glass without damaging the threaded portion 18 or marring the smooth portion 22. A camera attachment (not shown) can be positioned on the smooth surface 22 in order to take pictures of the inside of the pipes using infrared light and an appropriate film.

The inside surface 30, see FIG. 3, has a portion 31 and a portion 32 separated by a circular seat 34 formed therein on which rests an O-ring 36. The O-ring 36 is made of an elastic material such as rubber or the like and provides a seal between the circular seat 34 and the viewing glass 38. The viewing glass 38 is preferably clear shatter-proof glass which may have a magnification factor to enlarge the view of the inside of the pipe. The inside surface 39 of the viewing glass 38 is positioned at a distance greater than one inch from the end 20 in order that self-cleaning of the inside surface 39 will occur by the motion of the fluid against the glass.

The inside surface portion 31 has a groove 40 into which expands a snap-ring 42 to hold the viewing glass 38 and the O-ring 36 in sealing engagement with the circular seat 34. The groove 40 is precisely positioned with respect to the circular seat 34 such that when the O-ring 36 and viewing glass 38 are in position, a pressure of approximately 100 pounds per square inch is required to be exerted on the snap ring 42 to compress the O-ring 36 sufficiently to permit the snap-ring to enter groove 40. When the viewing glass 38 is sealed in the aforementioned manner, the sight glass can withstand fluid pressure against its inside surface 39 of approximately 700 pounds per square inch or up to 3400 pounds per square inch if the viewing window is made of certain plastic materials without leakage or damage to the glass. The snap-ring 42, the shatter-proof viewing glass 38 and the O-ring 34 are commercially available in standard sizes thus enabling the user to replace them at nominal cost.

The threaded portion 18 could be on the inside surface 30 to enable the sight glass 10 to be attached to corresponding threads 13 on the outside of a pipe 14 rather than as a plug for the end of a pipe fitting 12 as shown in FIG. 1. The threaded portion 18 could also be eliminated entirely and replaced with a smooth portion which can be soldered to the end of pipes or into pipe fittings which also do not have threads such as fittings made of copper or brass.

A port 44 extends from the outside portion 26 through the cylindrical housing 16 to the inside surface 30. The port 44 has standard pipe threads on the inside surface thereof to which a hose can be attached to clean the inside surface 39 of the viewing glass 38 or to inject or remove fluid from the pipe without the necessity of removing the entire sight glass apparatus. A plug (not shown) is inserted in the port 44 when it is not in use. The port 44 is positioned at an angle of 10 degrees with respect to the viewing glass surface 39 in order to direct the cleaning fluid from the port 44 against the viewing glass surface 39 to effect optimum cleaning of the glass. Further, the port 44 lies at a 10° angle to the normal of the hexagonal surface 28 from which it extends, as best seen in FIG. 2. Pipe or plug 46 carries a valve operable by hand via knob 47 and inlet 49 for coupling to a hose or the like carrying pressurized cleaning fluid.

What is claimed is:

1. A sight glass for inspecting the inside of a building plumbing pipe comprising:
   (a) a cylindrical housing having a longitudinal axis and a threaded outside portion extending from one end of said housing for threaded coupling to said plumbing pipe and a hollow inside portion, said inside portion having a circular seat and a spaced apart circular groove,
   (b) an O-ring on said seat,
   (c) a viewing window having a side thereof adjacent said O-ring,
   (d) a snap-ring adjacent said viewing window and in said circular groove to hold said O-ring and said viewing window in sealing engagement with the inside portion of said cylindrical housing, and
   (e) a port extending through said cylindrical housing adjacent said O-ring, the axis of said port facing said window at an angle of 10 degrees with respect to the plane of the side of said viewing window adjacent said O-ring and being radially inclined at an angle to a plane passing through the longitudinal axis of said housing and the intersection of the port axis with said housing.

2. The sight glass as claimed in claim 1, wherein said port is radially inclined 10° with respect to said longitudinal center plane.

3. The sight glass as claimed in claim 2, further comprising a valved fluid inlet plug threadably coupled exteriorly to said port.

References Cited

UNITED STATES PATENTS

| | | | |
|---|---|---|---|
| 2,681,034 | 6/1954 | Mannion | 73—334 X |
| 3,453,049 | 7/1969 | Wager | 73—324 X |
| 3,565,516 | 2/1971 | Thomas et al. | 350—319 |
| 2,647,406 | 8/1953 | Sorenson | 73—334 |
| 2,942,469 | 6/1960 | LeRoy | 73—334 |
| 1,305,032 | 5/1919 | Trent | 350—319 |
| 3,467,113 | 9/1969 | Jacobsen et al. | 134—113 |

FOREIGN PATENTS

| | | | |
|---|---|---|---|
| 85,450 | 4/1955 | Norway | 350—319 |
| 232,294 | 1964 | Austria | 350—319 |
| 514,133 | 10/1939 | Great Britain | 73—334 |

JOHN K. CORBIN, Primary Examiner

T. H. KUSMER, Assistant Examiner

U.S. Cl. X.R.

15—302; 73—334; 116—117; 134—113; 220—82